(12) United States Patent
Daemmrich et al.

(10) Patent No.: US 7,246,206 B2
(45) Date of Patent: Jul. 17, 2007

(54) METHOD AND DEVICE FOR STORING A COMPUTER PROGRAM IN A PROGRAM MEMORY OF A CONTROL UNIT

(75) Inventors: Uwe Daemmrich, Illingen (DE); Dieter Buchholz, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 10/608,759

(22) Filed: Jun. 27, 2003

(65) Prior Publication Data

US 2004/0153768 A1 Aug. 5, 2004

(30) Foreign Application Priority Data

Jun. 28, 2002 (DE) ............................. 102 29 817

(51) Int. Cl.
*G06F 12/00* (2006.01)
*G06F 13/00* (2006.01)
(52) U.S. Cl. ...................... 711/154; 711/100
(58) Field of Classification Search ............. 711/100, 711/154; 714/20
See application file for complete search history.

(56) References Cited

U.S. PATENT DOCUMENTS

| | | | |
|---|---|---|---|
| 4,351,050 A | | 9/1982 | Higashiyama |
| 4,410,991 A | * | 10/1983 | Lenart ........................... 714/22 |
| 4,525,780 A | * | 6/1985 | Bratt et al. .................. 711/163 |
| 5,526,486 A | * | 6/1996 | Moloney et al. ............... 714/49 |
| 6,301,673 B1 | * | 10/2001 | Foster et al. ................. 713/323 |
| 6,526,527 B1 | * | 2/2003 | Gall et al. ..................... 714/55 |
| 6,898,697 B1 | * | 5/2005 | Gao et al. .................... 712/229 |
| 6,938,183 B2 | * | 8/2005 | Bickel ......................... 714/12 |
| 2002/0073400 A1 | * | 6/2002 | Beuten et al. ............... 717/127 |
| 2002/0174386 A1 | * | 11/2002 | Bucksch et al. .............. 714/42 |
| 2003/0033562 A1 | * | 2/2003 | Von Wendorff .............. 714/42 |

FOREIGN PATENT DOCUMENTS

| | | |
|---|---|---|
| DE | 3606699 | 9/1987 |
| DE | 100 18 859 | 12/2001 |
| JP | 63155236 | 6/1988 |

OTHER PUBLICATIONS

Bignell, James et al., "Z80 Microprocessor Technology: Hardware, Software and Interface" 1986 pp. 21-22 and 124-134, Albany, Delmar Publishers ISBN: 0-8273-2492-8.

* cited by examiner

*Primary Examiner*—Tuan V. Thai
(74) *Attorney, Agent, or Firm*—Kenyon & Kenyon LLP

(57) ABSTRACT

A method and a device for storing a computer program in a program memory of a control unit. The computer program is stored according to predefinable rules in specific memory areas of the program memory. To recognize an erroneous jump into an unused memory area of the program memory, in which the computer program is not stored, as rapidly as possible and to prevent the control unit from being in an irregular state, selectable information, through which the control unit is transferred into a defined state, is stored in the unused memory areas of the program memory, in which the computer program is not stored.

32 Claims, 2 Drawing Sheets

METHOD AND DEVICE FOR STORING A COMPUTER PROGRAM IN A PROGRAM MEMORY OF A CONTROL UNIT

FIELD OF THE INVENTION

The present invention relates to a method for storing a computer program in a program memory of a control unit, the computer program being stored according to predefinable rules in specific memory areas of the program memory. The present invention also relates to a device for storing a computer program in a program memory of a control unit, the device having a first apparatus, arrangement or structure for storing the computer program according to predefinable rules in specific memory areas of the program memory. The present invention also relates to a control unit having a computing unit, in particular a microprocessor, and a program memory, on which a program is stored according to predefinable rules in specific memory areas of the program memory.

BACKGROUND INFORMATION

In motor vehicle control units, for example, locating the program code of a computer program for a computing unit, in particular for a microprocessor or for a CPU (central processing unit), and for any existing coprocessors, in accordance with an address mapping valid for the particular control unit and storing the code in a program memory of the control unit is available. Locating is understood as the assignment of specific parts of the computer program, referred to as program segments, to specific memory areas of the program memory.

The program code is located and stored in the program memory according to predefinable rules, which take the following facts into consideration, in particular:

Program segments which are frequently called are located in memory areas which allow rapid program execution, i.e., rapid execution of the program segments on the microprocessor or the CPU. These program segments (for example, the program code of rapid time grids) may be stored in an internal flash memory of the control unit.

The access possibilities to the program memory in the event of specific system states as a function of the hardware. Thus, for example, the internal flash memory may not be accessible in the event of undervoltage. In order to allow for this system state, the program segments which are to be reliably accessed in spite of undervoltage are located in an external flash memory and stored there.

The flash area which is located inside the CPU housing is referred to as an internal flash memory. In contrast, a separate IC (integrated circuit) component which may be accessed by the CPU via an external bus is referred to as an external flash memory.

Locating is performed after assembling, compiling, and linking the program code and before the computer program is stored in the program memory of the control unit. Overall, the method of storing a computer program in a program memory of a control unit results in program segments being distributed to different, non-contiguous address areas of the program memory.

During execution of the computer program stored in the program memory on a computing unit, in particular on a microprocessor or a CPU, it may occur for various reasons that the computer program jumps into unused memory areas of the program memory, in which no program code is stored. No defined program code is stored in the unused memory areas. After a jump into the unused memory area of the program memory, this undefined program code is therefore executed. In this way, the control unit may reach an undefined and therefore irregular state.

Causes for a jump of the computer program into the unused memory area of the program memory may be internal and external influences, for example, bit inversion in the flash memory or in a RAM (random access memory), the effects of excess EMC (electromagnetic compatibility) radiation, or latent programming errors.

Furthermore, various mechanisms may be used for recognizing an irregular state of the control unit and first transferring the system into a safe state and second ensuring the functionality of the control unit again. These available mechanisms may include, for example:
  an internal controller watchdog;
  monitoring of time grids;
  a two-computer concept;
  monitoring of the program execution for plausibility;
  a check sum test.

Through the exemplary mechanisms listed, the attempt is made to recognize, directly or indirectly, bit inversions in the flash memory or in the RAM, influences by electromagnetic radiation (EMC), or implausible states such as latent programming errors (e.g., jumps via miscalculated pointers), to transfer the control unit into a safe state, and to restore the functionality of the control unit. The robustness of the system is to be enhanced through the early recognition of irregular or undefined states of the control unit. The availability of the system is to be improved by rapidly restoring the functionality of the control unit.

Not transferring a monitoring system for a measurement and control device into a safe state immediately upon the occurrence of a malfunction of the measurement and control device, but only after multiple occurrences of a malfunction, is referred to in German Patent Application No. 100 18 859. Upon each occurrence of a malfunction, the count of a counter is increased. If the count exceeds a predefinable limit value, the monitoring system enters the safe state.

SUMMARY OF THE INVENTION

The exemplary embodiment and/or exemplary method of the present invention relates to a mechanism, through which undefined or irregular states of the control unit may be recognized, and the control unit may be transferred into a safe state and the functionality of the control unit may be restored.

The exemplary embodiment and/or exemplary method of the present invention provides that predefinable information which causes the control unit to be transferred into a defined state be stored in unused memory regions of the program memory, in which the computer program is not stored.

An aspect of the exemplary embodiment and/or exemplary method of the present invention therefore includes storing predefinable information, which may be a specific program code which causes the control unit to be transferred into a defined state, in the unused memory areas of the program memory, instead of the undefined program code. In addition, the functionality of the control unit may be restored through the predefinable information.

The exemplary embodiment and/or exemplary method of the present invention relates to a mechanism which prevents the computing unit, in particular the microprocessor or the CPU, from executing memory areas which are actually unused in the corresponding state of the computer program and therefore must not be used for program execution. If the computing unit branches into these memory areas, an implausible state exists in any case. In order to nonetheless be able to control the further execution of the computer program through this unused memory area and prevent a random return into existing program code of the computer program, this memory area is to be at least partially filled using a special program code, which causes the computing unit to be transferred into a defined state in a controlled way. The special program code may cause the computing unit to leave the unused memory area.

In order to obtain a diagnosis about the origin of the error which resulted in the jump into the unused memory area of the program memory, additional historical information may be stored in an interrupt service routine or in an error handling routine.

It is recognized as soon as a jump is made into an unused memory area and/or as soon as program instructions are executed from this memory area. The control unit is reset immediately or only after special error handling. The system is set back into a defined, operational state through a subsequent start-up of the control unit program. After the start-up of the control unit, the normal functionality of the control unit may be continued if there is no permanent error.

The exemplary mechanism according to the present invention provides a protective measure against program execution in the unused memory areas of a program memory, which must not be used in the corresponding state of the computer program. Through the exemplary embodiment and/or exemplary method of the present invention, the robustness of a computer program for a control unit is enhanced and the availability of the control unit is markedly improved. The occurrence of an implausible and/or irregular state is recognized immediately. In addition, implementation in existing software of all control units may be done. The exemplary mechanism according to the present invention may be implemented easily and rapidly in the control unit software. Since no expansion of the program code of the computer program is necessary, no additional outlay and no additional costs arise for the implementation of the exemplary embodiment and/or exemplary method of the present invention.

During the execution of the computer program, a computing unit, in particular a microprocessor or a CPU, of the control unit may jump into memory areas of the flash memory and/or pass through memory areas of the flash memory which are physically present but are unused in the current state of the computer program. If the computing unit erroneously jumps into these unused memory areas and/or reads out program code in these unused memory areas, the control unit may reach an irregular or undefined state. The computing unit will attempt to execute the program code read out of the unused memory areas. If the program code does not contain a jump, the computing unit will execute the program instructions read out linearly and will very probably reenter a memory area having regular program code of the computer program at some time. The system behavior during the execution of the program instructions from the unused memory area and the system behavior after a transition into the actually used memory area of the flash memory is not defined and/or not predictable and must therefore be avoided. This behavior is especially critical if it occurs in a time grid which is itself not checked for plausibility.

Using the exemplary embodiment and/or exemplary method of the present invention, such an undefined and/or irregular state of the control unit may be interrupted again immediately, which enhances the robustness of the control unit. In addition, through suitable selection of the predefinable information, the overall system may be rapidly transferred back into a safe state and the functionality of the control unit may be restored, thus markedly enhancing the availability of the control unit.

According to the exemplary embodiment and/or exemplary method of the present invention, the control unit is reset by the execution of the predefinable information on a computing unit, in particular on a microprocessor or a CPU (central processing unit), of the control unit. Therefore, a reset of the control unit is intentionally triggered through the information stored in the unused memory area. The reset may be caused by an appropriate program instruction (software reset) or through an instruction code which is not present in the computing unit and is therefore forbidden (illegal opcode) or, for example, by a "trap unconditionally" instruction to branch into an interrupt service routine and/or an error handling routine.

According to the exemplary embodiment and/or exemplary method of the present invention, an interrupt service routine may be called by the execution of the predefinable information on a computing unit, in particular on a microprocessor or a CPU, of the control unit. In the event of an interrupt, a running computer program of a processor is interrupted in favor of a more urgent program. In the event of an interrupt, the processor saves all of the data necessary for the further operation of the running computer program in a special memory area, the stack memory or stack. After the execution of the interrupt service routine, the processor then continues the running program. In the framework of the program which is invoked by the interrupt service routine, the system may be transferred into a safe state and the functionality of the control unit may be restored.

An error handling routine may be called by the execution of the predefinable information on a computing unit, in particular on a microprocessor or a CPU, of the control unit.

The control unit may be reset at the end of the interrupt service routine and/or at the end of the error handling routine. The reset of the control unit may be caused, for example, through an appropriate program instruction (software reset) or through an instruction code which is not present in the computing unit and is therefore forbidden (illegal opcode) or, for example, through a "trap unconditionally" instruction to branch into an interrupt service routine and/or an error handling routine. The reset results in a start-up of the control unit program. Information about the precise location of the occurrence and the history (e.g., a return address in the computer program) may be stored within either the interrupt service routine or the error handling routine. Conclusions (for example, about the frequency of the occurrence of an error) may be drawn from this information.

The precise implementation of the exemplary embodiment and/or exemplary method of the present invention is a function of the computing unit used, in particular the type of microprocessor or CPU used. Various computing units differ, for example, in the instruction set used, which is executed on the computing unit. The precise implementation of the exemplary embodiment and/or exemplary method of the present invention is also a function of the desired scope of the functionality of the mechanism, i.e., of the desired "intelligence" of the recognition, the transfer into a safe state, and the restoration of the functionality of the control unit.

Storing the predefinable information only in selected unused memory areas of the program memory may be done. However, according to the exemplary embodiment and/or exemplary method of the present invention, the predefinable information is stored in all unused memory areas of the program memory.

According to the exemplary embodiment and/or exemplary method of the present invention, at least one unused memory area of the program memory may be completely filled by the predefinable information. Completely filling only selected unused memory areas of the program memory using the predefinable information, or filling all of the unused areas, may be done.

According to the exemplary embodiment and/or exemplary method of the present invention, the predefinable information is stored in predefinable intervals in at least one unused memory area of the program memory, the part of the unused memory area in which the predefinable information is not stored not causing jumps or endless loops. The predefinable information may be stored at regular intervals in the at least one unused memory area of the program memory.

According to the exemplary embodiment and/or exemplary method of the present invention, the predefinable information is merely stored at the end of at least one unused memory area of the program memory. However, it must be ensured in this case that the part of the unused memory area in which no predefinable information is stored does not cause jumps or endless loops.

In the exemplary embodiment and/or exemplary method of the present invention, based on the device of the type initially cited, the device may include a second apparatus, arrangement or structure for storing predefinable information, which transfers the control unit into a defined state, in unused memory areas of the program memory in which the first apparatus, arrangement or structure has not stored the computer program.

According to the exemplary embodiment and/or exemplary method of the present invention, the second apparatus, arrangement or structure is implemented as a hexadecimal editor. Using the hexadecimal editor, the unused memory areas, which are not used in the corresponding state of the computer program, may be filled using special hexadecimal code. The unused program memory is filled as the state of the computer program is produced.

According to the exemplary embodiment and/or exemplary method of the present invention, the device has a apparatus, arrangement or structure for executing the exemplary method according to the present invention.

With the exemplary embodiment and/or exemplary method of the present invention, based on the control unit of the type initially cited, predefinable information, through which the control unit may be transferred into a defined state, may be stored in unused memory areas of the program memory in which the computer program is not stored.

According to the exemplary embodiment and/or exemplary method of the present invention, the predefinable information according to the exemplary method according to the present invention is stored in the unused memory areas of the program memory.

DETAILED DESCRIPTION

Figure 1:
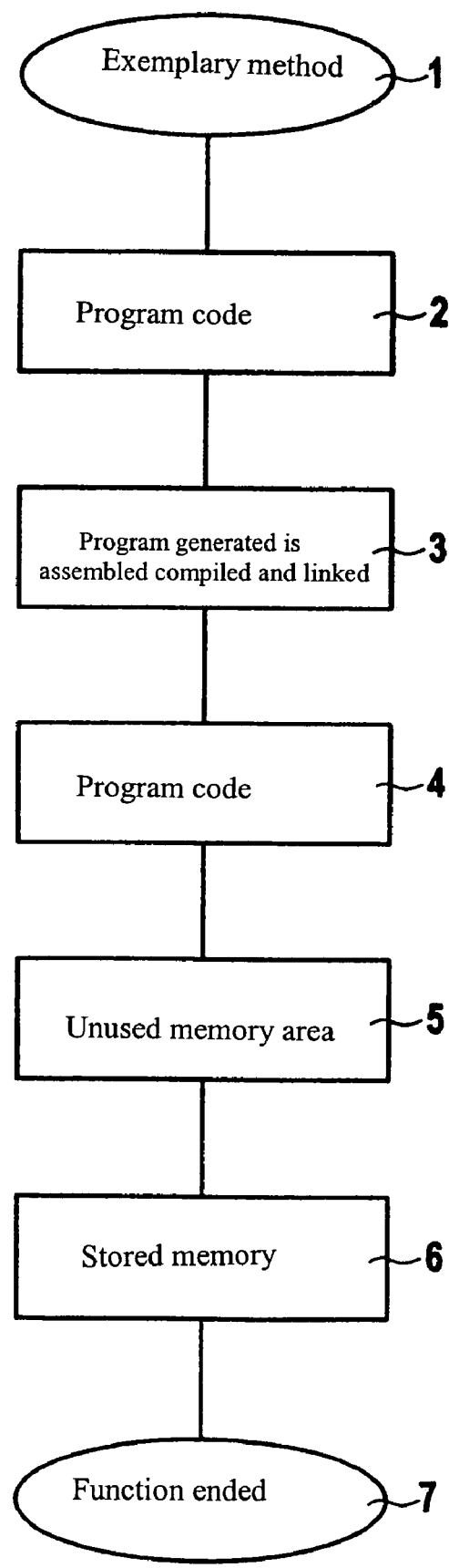
FIG. 1 shows a flowchart of the exemplary method according to the present invention.

A sequence of the exemplary method according to the present invention according to an exemplary embodiment is illustrated in FIG. 1. The exemplary method according to the present invention begins in a function block 1. In a function block 2, the program code for a specific computer program is generated. The computer program is used, for example, for controlling and/or regulating a specific functionality in a motor vehicle. In a function block 3, the computer program generated is assembled, compiled, and linked. The program code is subsequently located in a function block 4. In the framework of the locating, the computer program is assigned to specific memory areas of a program memory according to predefinable rules. For example, the following facts are taken into consideration when locating the program code:

Parts of the computer program, referred to as program segments, which are called more frequently (the program code of rapid time grids, for example), are located in memory areas which allow rapid program execution, for example, in an internal flash memory.

Program segments which are still to be reliably accessed in spite of specific system states dependent on the hardware are located in appropriate memory areas which may still be accessed even in these system states. If access to an internal flash memory is not available in the event of undervoltage, the corresponding program segments are located in an internal flash memory.

Locating distributes the computer program to different, non-contiguous address areas of the program memory.

The computer program is not stored in some memory areas of the program memory, and these memory areas therefore remain unused. A computing unit, in particular a microprocessor or a CPU (central processing unit), may jump into these unused memory areas of the program memory and/or pass through these unused memory areas during the program execution.

These unused memory areas are physically present, but are not used in the current program state and are therefore free. If the computing unit erroneously jumps into these unused memory areas and/or reads out program code in these unused memory areas, the control unit may reach an undefined and therefore irregular state. The computing unit attempts to execute the program code read out from the unused memory area. If the program code does not contain a jump, the computing unit linearly executes the program instructions read in and is highly likely to enter a memory area in which the regular program code of the program is stored.

The system behavior during the execution of program instructions from the unused memory area and after a transition into the memory area of the program memory actually used by the computer program is not predictable and must therefore be avoided. This behavior is especially critical if it occurs in a time grid which is not itself checked for plausibility.

The exemplary embodiment and/or exemplary method of the present invention suggests a further mechanism, through which this irregular state is interrupted immediately upon its occurrence, the overall system is transferred into a safe state, and the functionality of the control unit is restored. For this purpose, in the exemplary method according to the present invention, predefinable information is located in the unused memory area of the program memory in a function block 5. The predefinable information causes a reset of the control unit when it is executed on the computing unit, in particular on the microprocessor or CPU. However, an interrupt service routine or an error handling routine may first be called by the execution of the predefinable information on the computing unit. At the end of the routine, the control unit may then be reset through a software reset, for example, and started up again. The control unit is then in a defined, completely operational state and may continue with the execution of the computer program.

The predefinable information may be stored in only part of the unused memory areas of the program memory. However, the predefinable information may be stored in all unused memory areas of the program memory. Furthermore, the predefinable information may be stored in only part of an unused memory area, for example, at the end of the unused memory area. However, it must be ensured in this case that the part of the unused memory area in which the predefinable information is not stored does not cause jumps or endless loops if the program code contained therein is executed on the computing unit. An unused memory area of the program memory may, however, be completely filled using the predefinable information.

In a function block 6 of the exemplary method according to the present invention, the program code of the computer program located in function block 4 and the predefinable information located in function block 5 is stored in the corresponding memory areas of the program memory. The exemplary method according to the present invention is ended in a function block 7.

According to an exemplary method according to the present invention, which is not shown in the figures, however, all existing memory areas of the program memory are initially filled using the predefinable information. Subsequently, only the program code of the computer program obtained from the locator is written over this information in the appropriate memory areas. This method has the advantage that a check sum may then be formed over all areas.

Figure 2:
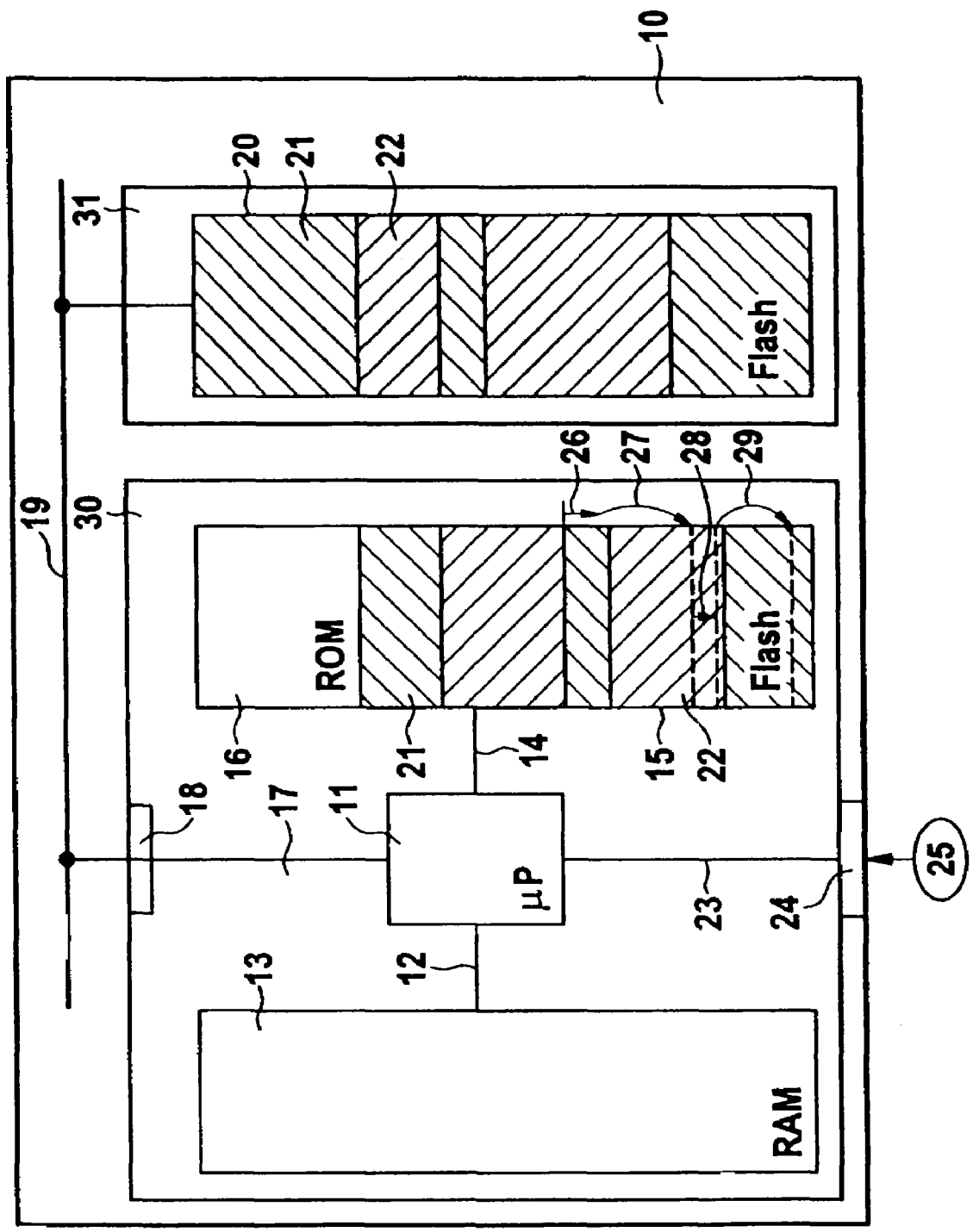
FIG. 2 shows an exemplary control unit according to the present invention.

In FIG. 2, a control unit according to an exemplary embodiment of the present invention as a whole is identified by reference number 10. Control unit 10 is used, for example, for controlling and/or regulating specific functionalities in a motor vehicle. Control unit 10 includes a CPU (central processing unit) component 30 and a separate IC (integrated circuit) component 31, on which an external flash memory 20 is positioned. CPU component 30 includes a computing unit 11, which is implemented as a microprocessor or a CPU, for example. Computing unit 11 is connected via a first data connection 12 to a rapid operating memory 13, which is implemented as a static or dynamic RAM (random access memory).

Computing unit 11 is connected via a second data connection 14 to an internal flash memory 15 and a ROM (read only memory) 16. ROM 16 is a read only memory, in which the BIOS (basic input output system) is stored, for example.

Computing unit 11 is connected via a third data connection 17 and a communication controller 18 to a data bus 19. External flash memory 20 is connected to data bus 19, for example, so that computing unit 11 may access external flash memory 20 via data bus 19. Internal flash memory 15 and external flash memory 20 form the program memory, in which computer program 21 is stored in specific memory areas and predefinable information 22 is stored in the remaining unused memory areas. Computing unit 11 is connected via a fourth data connection 23 to an interface 24, via which a device 25 for storing computer program 21 and predefinable information 22 may be connected to the memory areas of the program memory provided for this purpose.

The related art, in which an erroneous jump is made (arrow 27) into the following unused memory area of flash memory 15 during the execution of computer program 21 (arrow 26), will be described on the basis of internal flash memory 15. Computing unit 11 reads out program instructions from the unused memory area and executes them (arrow 28). Since the program instructions read out of the unused memory area are predefinable information, through which control unit 10 is transferred into a defined state, there is no danger in the exemplary embodiment and/or exemplary method of the present invention that computer program 21 enters an uncontrolled endless loop or that control unit 10 enters an undefined and therefore irregular state. The defined state of control unit 10 may be achieved through a software reset, for example. For this purpose, computing unit 11 jumps, caused by the execution of the program instructions (arrow 28), to a specific reset address (arrow 29) of a memory area of program memory 15, 20, in which computer program 21 is stored. Computer program 21 then starts up again and the execution of computer program 21 starts from the beginning again.

The defined state of control unit 10 may, however, also be achieved by executing an interrupt service routine or an error handling routine. For this purpose, computing unit 11 jumps, caused by the execution of the program instruction (arrow 28), to a specific memory address of a memory area of program memory 15, 20, in which computer program 21 is stored. This memory address corresponds to the beginning of the interrupt service routine or the error handling routine. After execution of the interrupt service routine or the error handling routine, computing unit 11 may jump to the reset address in order to reset control unit 10.

The predefinable information stored in the unused memory areas is, for example, implemented as a program code in a hexadecimal format, referred to as hexadecimal code. Device 25 may, for example, include a hexadecimal editor for filling up the unused memory areas of program memory 15, 20. The hexadecimal code used for the predefinable information is to fulfill one of the following possible functions:

filling up the entire unused memory area using at least one program instruction, which triggers a reset of control unit 10 (reset) in a controlled way. For a microcontroller of the type 80C166 from Siemens, this corresponds to an instruction SRST or illegal opcode, for example.

filling up the entire unused memory area using at least one program instruction, through which a jump is made into the interrupt service routine.

filling up the entire unused memory area using at least one program instruction, through which a jump is made into a special error handling routine.

implementing at least one program instruction according to the three possibilities above only at the end of an unused memory area and may be also at regular intervals, e.g., every 512 bytes. However, this requires that the other program instructions in the unused memory area do not cause jumps or endless loops.

The control unit is to be reset using software, for example, at the end of the interrupt service routine and at the end of the error handling routine. The software reset results in a restart of control unit 10. Historical information about the precise location of the occurrence and its history may be stored, for example, during the interrupt service routine and during the error handling routine, e.g., return addresses. Conclusions about the frequency of the occurrence of an error, for example, may be drawn from this information.

What is claimed is:

1. A method for storing a computer program in a program memory of a control unit, the method comprising:
storing the computer program according to predefinable rules in specific memory areas of the program memory; and
storing predefinable information, which is used to transfer the control unit into a defined state, in unused memory areas of the program memory where the computer program is not stored, wherein the predefinable information is stored at predefinable intervals in at least one unused memory area of the program memory, a part of the unused memory area in which the predefinable information is not stored not causing at least one of a jump and an endless loop.

2. The method of claim 1, further comprising:
resetting the control unit by executing the predefinable information on a computing unit of the control unit.

3. The method of claim 1, wherein an interrupt service routine is invoked by executing the predefinable information on a computing unit of the control unit.

4. The method of claim 3, wherein the control unit is reset at the end of the interrupt service routine.

5. The method of claim 1, wherein an error handling routine is invoked by executing the predefinable information on a computing unit of the control unit.

6. The method of claim 5, wherein the control unit is reset at the end of the error handling routine.

7. The method of claim 1, wherein the predefinable information is stored in all unused memory areas of the program memory.

8. The method of claim 1, wherein at least one unused memory area of the program memory is completely filled using the predefinable information.

9. The method of claim 1 wherein the predefinable information is stored at regular intervals in the at least one unused memory area of the program memory.

10. The method of claim 1, wherein the predefinable information is stored at an end of at least one unused memory area of the program memory, a part of the unused memory area in which the predefinable information is not stored not causing at least one of a jump and an endless loop.

11. The method of claim 1, further comprising:
resetting the control unit by executing the predefinable information on a microprocessor of the control unit.

12. A device for storing a computer program in a program memory of a control unit, the device comprising:
a first storing arrangement to store the computer program in specific memory areas of the program memory according to predefinable rules; and
a second storing arrangement to store predefinable information, which transfers the control unit into a defined state, in unused memory areas of the program memory, in which the first storing arrangement has not stored the computer program, wherein the predefinable information is stored at predefinable intervals in at least one unused memory area of the program memory, a part of the unused memory area in which the predefinable information is not stored not causing at least one of a jump and an endless loop.

13. The device of claim 12, wherein the second storing arrangement includes a hexadecimal editor.

14. The device of claim 12, wherein the device includes a resetting arrangement to reset the control unit by executing the predefinable information on a computing unit of the control unit.

15. The device of claim 12, wherein an interrupt service routine is invoked by executing the predefinable information on a computing unit of the control unit.

16. The device of claim 15, wherein the control unit is reset at the end of the interrupt service routine.

17. The device of claim 12, wherein an error handling routine is invoked by executing the predefinable information on a computing unit of the control unit.

18. The device of claim 17, wherein the control unit is reset at the end of the error handling routine.

19. The device of claim 12, wherein the predefinable information is stored in all unused memory areas of the program memory.

20. The device of claim 12, wherein at least one unused memory area of the program memory is completely filled using the predefinable information.

21. The device of claim 12 wherein the predefinable information is stored at regular intervals in the at least one unused memory area of the program memory.

22. The device of claim 12, wherein the predefinable information is stored at an end of at least one unused memory area of the program memory, a part of the unused memory area in which the predefinable information is not stored not causing at least one of a jump and an endless loop.

23. A control unit comprising:
a computing unit; and
a program memory, at which a computer program is stored in specific memory areas of the program memory according to predefinable rules, wherein, in unused memory areas of the program memory, where the computer program is not stored, predefinable information is stored, which is used to transfer the control unit into a defined state, wherein the predefinable information is stored at predefinable intervals in at least one unused memory area of the program memory, a part of the unused memory area in which the predefinable information is not stored not causing at least one of a jump and an endless loop.

24. The control unit of claim 23, wherein the control unit includes an arrangement for resetting the control unit by executing the predefinable information on the computing unit of the control unit.

25. The control unit of claim 23, wherein an interrupt service routine is invoked by executing the predefinable information on the computing unit of the control unit.

26. The control unit of claim 25, wherein the control unit is reset at the end of the interrupt service routine.

27. The control unit of claim 23, wherein an error handling routine is invoked by executing the predefinable information on the computing unit of the control unit.

28. The control unit of claim 27, wherein the control unit is reset at the end of the error handling routine.

29. The control unit of claim 23, wherein the predefinable information is stored in all unused memory areas of the program memory.

30. The control unit of claim 23, wherein at least one unused memory area of the program memory is completely filled using the predefinable information.

31. The control unit of claim 23, wherein the predefinable information is stored at regular intervals in the at least one unused memory area of the program memory.

32. The control unit of claim 23, wherein the predefinable information is stored at an end of at least one unused memory area of the program memory, a part of the unused memory area in which the predefinable information is not stored not causing at least one of a jump and an endless loop.

* * * * *